United States Patent
Yap et al.

(10) Patent No.: US 8,948,363 B2
(45) Date of Patent: *Feb. 3, 2015

(54) METHOD AND SYSTEM FOR CONFERENCE CALL SCHEDULING VIA E-MAIL

(71) Applicant: BlackBerry Limited, Waterloo (CA)

(72) Inventors: Shen-Yuan Michael Yap, Sherman Oaks, CA (US); Douglas Gisby, Atlanta, GA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/920,697

(22) Filed: Jun. 18, 2013

(65) Prior Publication Data

US 2013/0287197 A1 Oct. 31, 2013

Related U.S. Application Data

(63) Continuation of application No. 13/477,329, filed on May 22, 2012, now Pat. No. 8,488,763, which is a continuation of application No. 12/394,408, filed on Feb. 27, 2009, now Pat. No. 8,204,197.

(51) Int. Cl.
  *H04M 3/42* (2006.01)
  *H04M 3/56* (2006.01)

(52) U.S. Cl.
  CPC .............. *H04M 3/567* (2013.01); *H04M 3/56* (2013.01); *H04M 3/563* (2013.01); *H04M 3/565* (2013.01); *H04M 2203/5063* (2013.01)
  USPC ....... 379/202.01; 370/261; 709/204; 709/227

(58) Field of Classification Search
  USPC ............... 379/202.01; 370/261; 709/204, 227
  See application file for complete search history.

(56) References Cited

U.S. PATENT DOCUMENTS

| 5,872,841 | A  | 2/1999  | King et al. |
| 6,870,916 | B2 | 3/2005  | Henrikson et al. |
| 7,050,557 | B2 | 5/2006  | Creamer et al. |
| 7,162,025 | B2 | 1/2007  | Schnurr |
| 8,204,197 | B2 | 6/2012  | Yap et al. |
| 8,279,261 | B2 * | 10/2012 | Khot et al. ................. 348/14.09 |

(Continued)

FOREIGN PATENT DOCUMENTS

CA    2522881    4/2007

OTHER PUBLICATIONS

Garrett, Michael, "YOOMBA—Turn Your Email into a Phone", Sep. 3, 2007 (7 pages).

(Continued)

*Primary Examiner* — Quynh Nguyen
(74) *Attorney, Agent, or Firm* — Fish & Richardson P.C.

(57) ABSTRACT

A method and system for conference call scheduling using e-mail. The method and system can receive and parse an e-mail received from a conference moderator, containing scheduling and participant information and schedule a conference call with minimal further user intervention. In essence, the method and system can operate as a virtual administrative assistant to identify and collect telephone contact information for each of the proposed conference call participants, using a customizable hierarchy of internal and external sources of contact information. In this manner, the conference moderator does not need know telephone contact information for each conference call participant.

23 Claims, 11 Drawing Sheets

(56) References Cited

U.S. PATENT DOCUMENTS

| | | |
|---|---|---|
| 2002/0098831 A1 | 7/2002 | Castell et al. |
| 2005/0091272 A1* | 4/2005 | Smith et al. ............. 707/104.1 |
| 2005/0238156 A1 | 10/2005 | Turner |
| 2006/0009249 A1 | 1/2006 | Fu et al. |
| 2006/0010200 A1 | 1/2006 | Mousseau et al. |
| 2006/0029003 A1 | 2/2006 | Hassan et al. |
| 2007/0121909 A1 | 5/2007 | Schnurr |
| 2007/0218885 A1 | 9/2007 | Pfleging et al. |
| 2007/0280464 A1 | 12/2007 | Hughes et al. |
| 2007/0294120 A1 | 12/2007 | Berstis et al. |
| 2008/0159179 A1 | 7/2008 | Shaffer et al. |
| 2008/0205616 A1 | 8/2008 | Teng et al. |
| 2010/0121666 A1 | 5/2010 | Niazi |

OTHER PUBLICATIONS

"Gaboogie delivers conference call notification for mobile users and attendee phone number updates mechanism", SIPthat VoIP & IP Communication Blog, posted by Erik on Jun. 8, 2007 (1 page).

Intel, Application Note "Media Server Solution Recipe: Conferencing Applications", Intel Corporation 2003 (17 pages).

Nortel, Solution Brief, "Multimedia Communication Server 5100 Conferencing", Nortel Networks 2007 (2 pages).

Canadian Office Action dated Apr. 10, 2012, issued in Canadian Application No. 2,694,723, (2 pages).

European Search Report mailed May 20, 2009, issued in European Application No. EP 09250547.8, (5 pages).

Office Action mailed Dec. 15, 2011, issued in U.S. Appl. No. 12/394,408, (14 pages).

Notice of Allowance mailed Feb. 29, 2012, issued in U.S. Appl. No. 12/394,408, (12 pages).

Notice of Allowance mailed Mar. 19, 2013, issued in U.S. Appl. No. 13/477,329, (8 pages).

* cited by examiner

METHOD AND SYSTEM FOR CONFERENCE CALL SCHEDULING VIA E-MAIL

CROSS-REFERENCE

This application is a continuation of U.S. patent application Ser. No. 13/477,329, filed on May 22, 2012, which is a continuation of U.S. patent application Ser. No. 12/394,408, filed on Feb. 27, 2009, titled "Method and System for Conference Call Scheduling Via E-Mail," (now U.S. Pat. No. 8,204,197), the disclosures of which are expressly incorporated herein by reference in their entirety.

FIELD

The present application relates to the field of collaboration tools, specifically, providing a method and system for conference call initiation using electronic mail.

BACKGROUND

Typically, conference calls are connected through a conference bridge capable of servicing multiple calls simultaneously. Such calls are traditionally of the 'Meet Me' type, meaning that attendees call into the conference bridge and utilize a unique PIN number to access their call. This type of system, though easy to set up, is not always the most reliable. For instance, all participants of the conference must remember to call into the conference system at the appointed time. An alternate type of conference call is the 'Get Me' type, where the conference system is adapted to call each of the participants at an appointed time. Setup of such calls, however, comes with drawbacks. The call moderator must know telephone contact information for each of the participants, and must also perform a call setup procedure using a direct interface to the conference system. Moreover, the contact numbers must generally be entered manually, which can be a time consuming practice.

Business professionals have become more mobile; this has highlighted a need for collaboration tools that operate seamlessly without need for user intervention. Although advances in collaboration tools have allowed a conference initiator to use programs such as Microsoft Office Outlook™ to schedule calls, mobile professionals often do not have access to these programs while out of the office. With the proliferation of mobile communications devices such as the BlackBerry™, Palm Treo™ and Apple iPhone™ which allow for remote access to e-mail, it would be advantageous to allow such conference calls to be scheduled using an e-mail.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In one aspect, the present application provides a method of scheduling a conference call. The method comprises receiving and parsing a conference call request communication on a conference call server, the communication comprising schedule information and identity information of at least one participant, determining telephone contact information for each participant by querying a customizable hierarchy of sources of contact information, and scheduling the conference call on the conference call server according to the schedule information in the communication.

In another aspect, the present application provides a conference call scheduling system. The system comprises a conference call server configured to receive and parse a conference call request communication comprising schedule information and identity information of at least one participant to a conference call, the conference call server being adapted to determine telephone contact information for each participant by querying a customizable hierarchy of sources of contact information; and a conference bridge configured to connect the participants to the conference call according to the telephone contact information determined by the conference call server and the scheduling information of the communication.

In another embodiment, another method of scheduling a conference call is disclosed. The method comprises receiving and parsing a conference call request communication on a conference call server, the communication comprising schedule information and identity information of at least one participant, determining telephone contact information for each participant by searching internal, networked and Internet sources, verifying the results of those searches with a moderator of the conference call, and scheduling the conference call on the conference call server according to the schedule information in the communication.

In a further embodiment, the present application provides a conference call scheduling system comprising a conference call server configured to receive and parse a conference call request communication comprising schedule information and identity information of at least one participant to a conference call, the conference call server being adapted to determine telephone contact information for each participant by searching internal, networked and Internet sources and verifying the results of those searches with a moderator of the conference call; and a conference bridge configured to connect the participants to the conference call according to the telephone contact information determined by the conference call server and the scheduling information of the communication.

In yet another aspect, the present application provides a conference call server comprising means for receiving and parsing a conference call request communication on a conference call server, the communication comprising schedule information and identity information of at least one participant, means for determining telephone contact information for each participant by querying a customizable hierarchy of sources of contact information; and means for scheduling the conference call on the conference call server according to the schedule information in the communication.

In yet a further embodiment of the present application provides a conference call server comprising means for receiving and parsing a conference call request communication on a conference call server, the communication comprising schedule information and identity information of at least one participant, means for determining telephone contact information for each participant by searching internal, networked and Internet sources and verifying the results of those searches with a moderator of the conference call, and means for scheduling the conference call on the conference call server according to the schedule information in the communication.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

The present application relates to the control and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Figure 1:
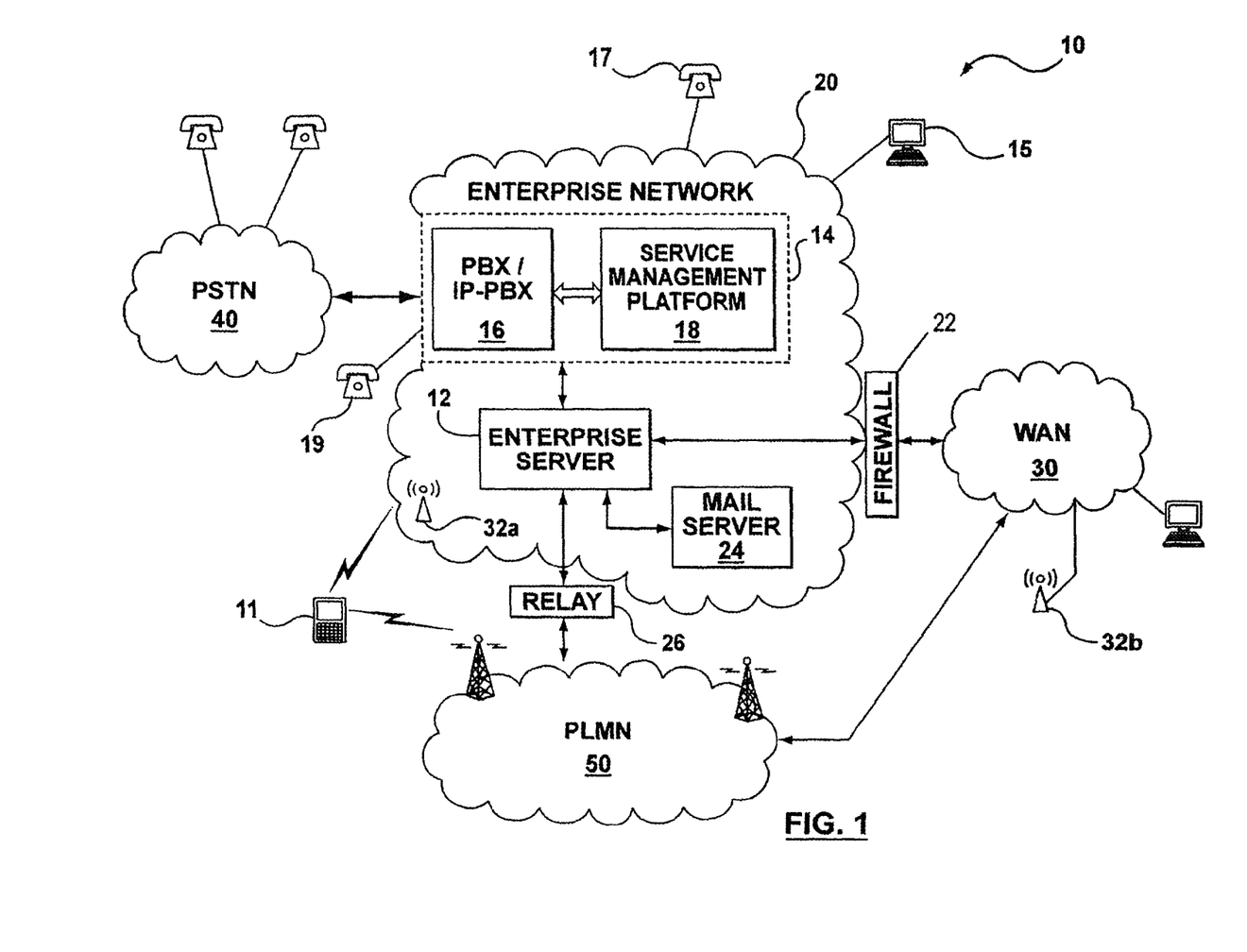
FIG. 1 shows, in block diagram form, an example system for managing enterprise-related mobile calls, including an enterprise communications platform.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
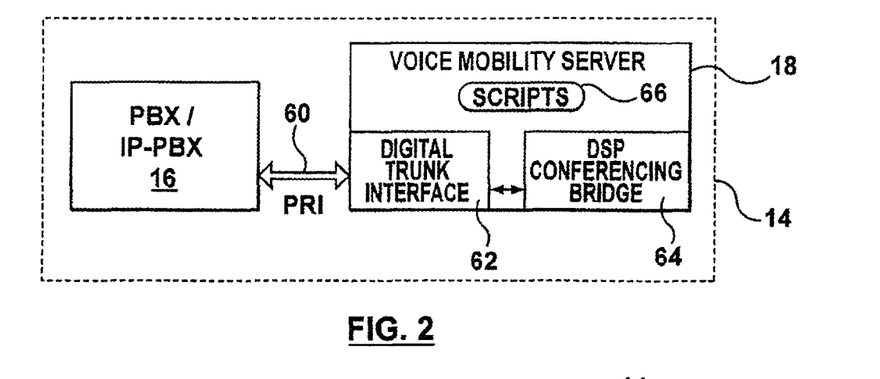
FIG. 2 shows, in block diagram form, further details of an embodiment of the enterprise communications platform.
Figure 3:
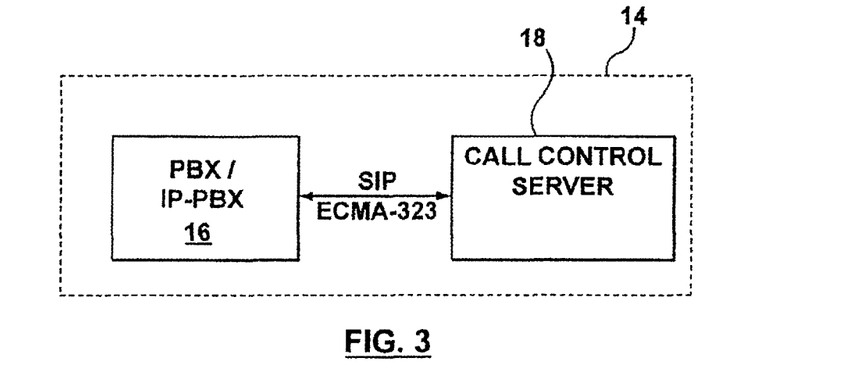
FIG. 3 shows another embodiment of the enterprise communications platform.
Figure 4:
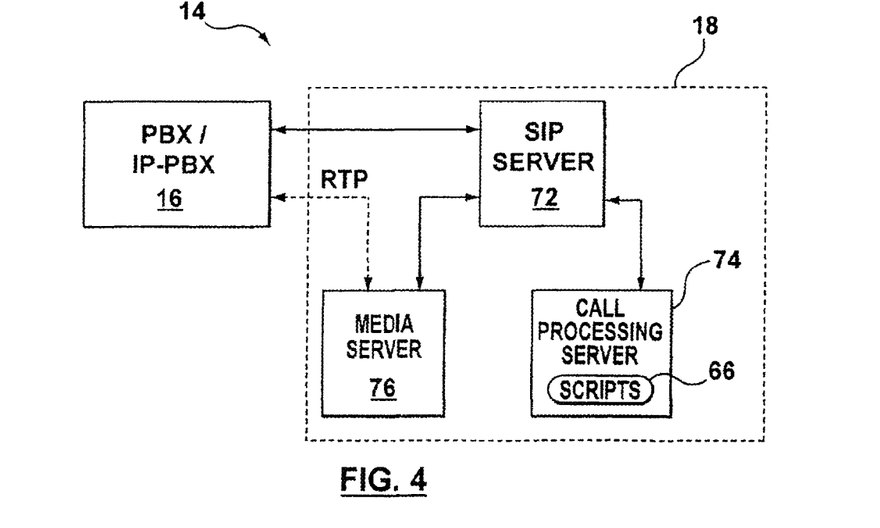
FIG. 4 shows yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5:
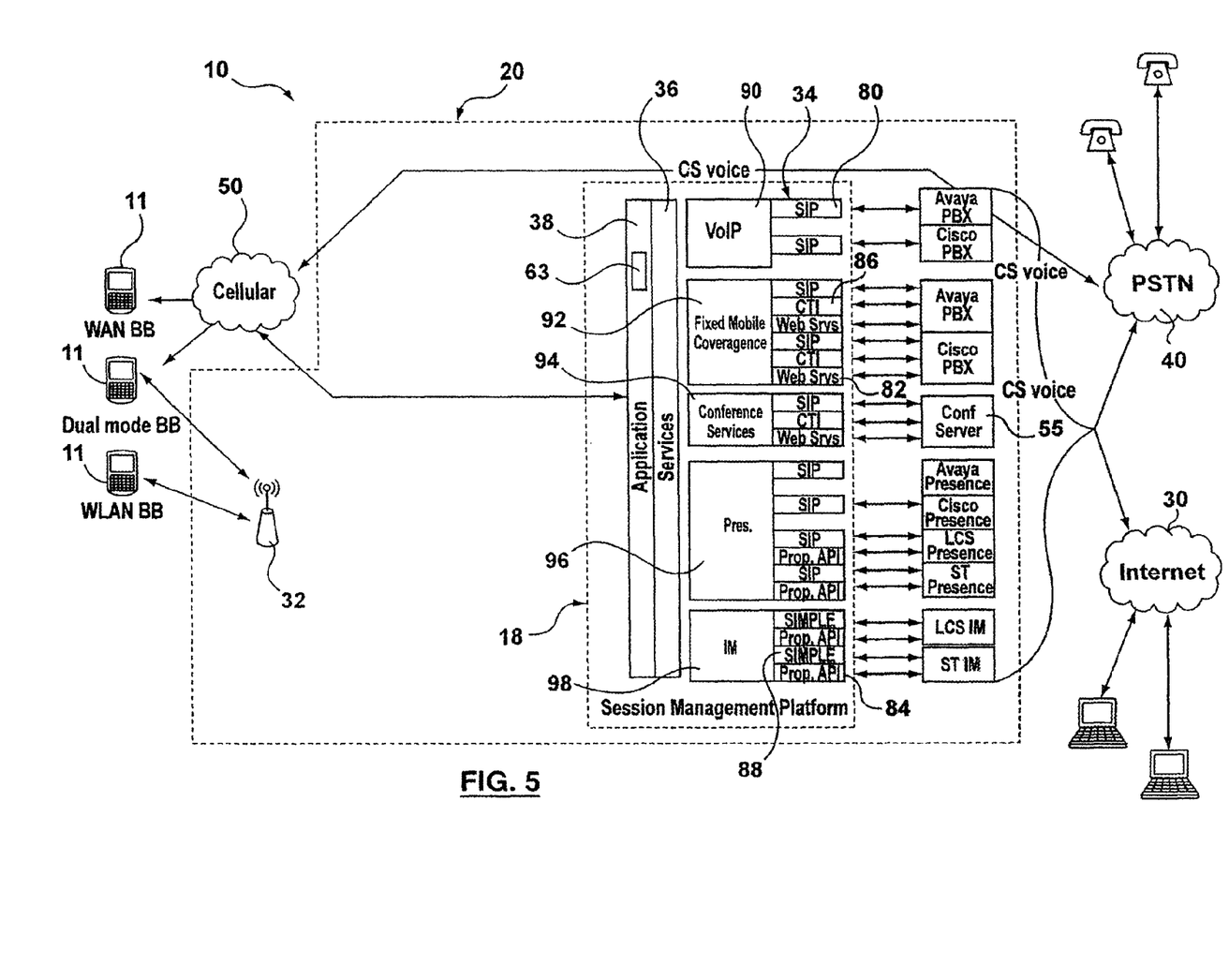
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98.

Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. The conference call server 55 is configured for directing media and data streams to and from one or more communication devices (i.e., mobile devices 11, telephones 17, and computers 15).

One of the features of the conference services application (CSA) 63 is 'Get Me' conference wherein the CSA arranges calls to conference participants at a scheduled time using contact information provided by the conference moderator. When scheduling a conference call, the conference moderator has to create a participant list; minimally, the conference initiator can enter participant telephone contact information. The conference moderator can also enter a participant's email address, in the case that the moderator does not know telephone contact information for the participant. CSA 63 also supports traditional 'Meet Me'-type conference calls where participants call into the conference bridge and enter a unique PIN number for that call.

Figure 6A:
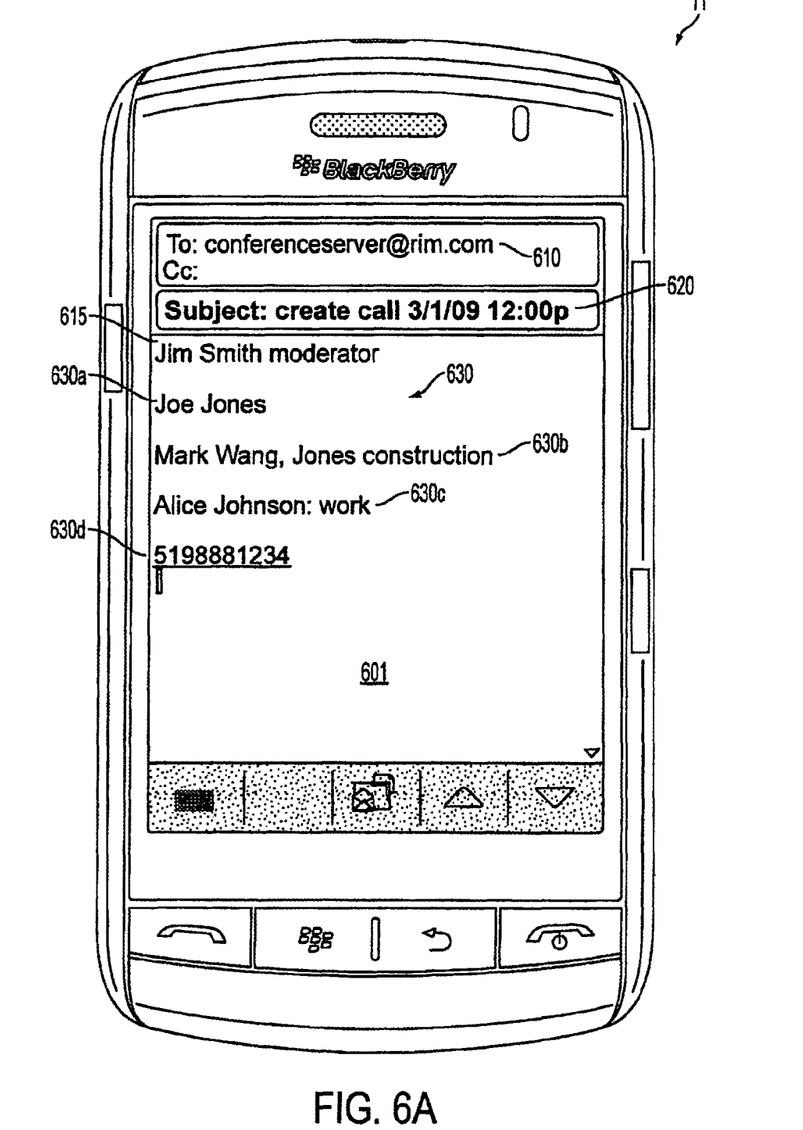
FIGS. 6A-6E show exemplary communications on a mobile communications device according to an embodiment of the methods and systems disclosed herein.

In accordance with an embodiment described herein, CSA 63 and conference call server 55 also support scheduling of conference calls via e-mail. The conference call server 55 is adapted to parse and thereby 'read' any e-mails sent to it. FIGS. 6A-6E show example communications between a user initiator and conference call server 55 to set up such a call. FIG. 6A shows a user e-mail 601 displayed on a mobile communications device 11 to an e-mail address of the conference call server 610. In the subject line 620, the user can enter one of a plurality of commands such as CREATE, MODIFY, DELETE, RESCHEDULE, which correspond to creating, modifying, deleting and rescheduling a conference call. The e-mail 601 in FIG. 6A shows the user of the mobile communication device creating a call for a specified date and time. In the body 630 of the e-mail 601, the user can list identity information for the moderator and participants. The user initiator and moderation can optionally be the same person. In another embodiment, the user sending the e-mail to the conference server is automatically assigned as moderator of the conference call.

In the illustrated e-mail 601, it can be seen that the user has specified "Jim Smith" as a moderator 615. The user can also specify any number of participants 630a-603d. Participants 630a-630d can be entered by name (see participant 630a), telephone number (participant 630d) or other unique identifier (e.g., participants 630b, 630c). Participants entered by telephone number (e.g., participant 630e) can be associated with a particular contact entry. For example, when a telephone number matches a number on file for a particular contact entry, the conference call server 55 can identify that the particular contact has been invited to the conference call. The conference call server 55 is also adapted to recognize descriptive attributes appended to entries for participants. For instance, where a common name is used, a user may append a company name to the participant name (e.g., participant 630*b*). A user may also specify which of a plurality of contact numbers associated with a contact entry should be used (e.g., participant 630*d*). In FIG. 6A, the user has specified that a work number be used for participant 630*d*. In another embodiment, the server can use the "CC" or "To" fields of an email to set up the participant list. Once the user has finished specifying parameters in e-mail 601, it is sent to the conference call server 55.

Figure 6B:
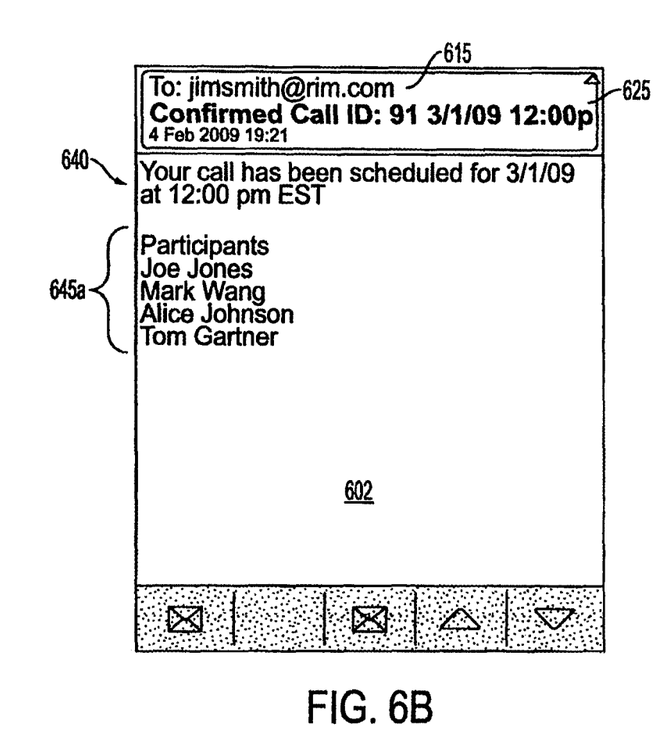

FIG. 6B shows an example of a confirmation e-mail 602 sent by conference call server 55 to an e-mail address of the moderator 615 of the conference call scheduled by e-mail 601. For clarity of the figures, the components of mobile communications device 11 are not shown in the remaining FIGS. 6B-7D. In one embodiment, conference calls can be given a unique numerical identifier (as communicated to the moderator 615 in the subject line 625). The confirmation e-mail 602 discloses information regarding scheduling of the call 640, as well as a participant list 645. For this illustrated example, it can be seen that the conference call server 55 has matched the telephone number of participant 630*d* (provided in the scheduling e-mail 601) to a contact entry on file ("Tom Gartner").

Figure 6C:
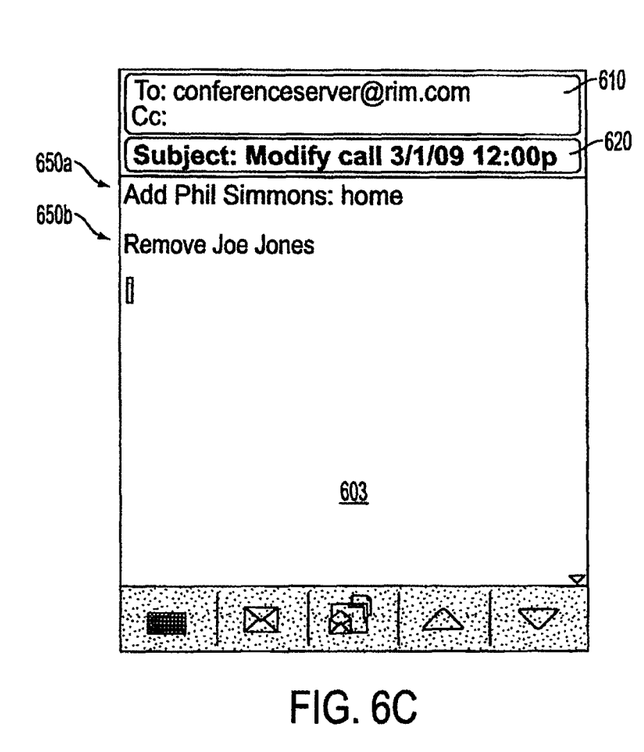
Figure 6D:
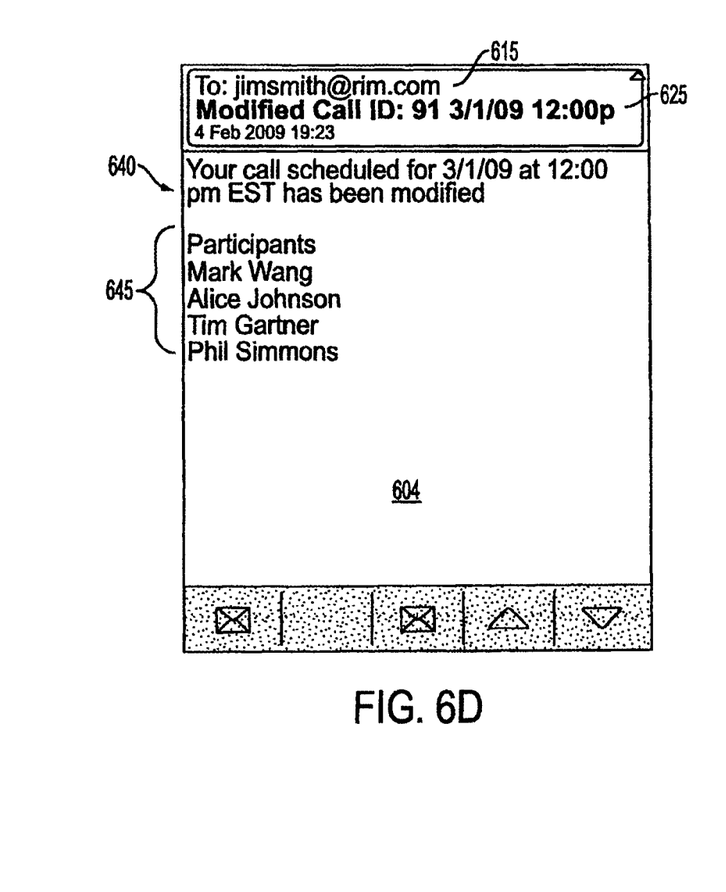

After the conference call server 55 has scheduled the conference call in response to receipt of e-mail 601 (and optionally, after the moderator 615 has received confirmation e-mail 602), the moderator 615 can also modify, by e-mail 603, the details of an already-existing conference, as shown in FIG. 6C. In such a modification e-mail 603, the moderator can enter a plurality of commands such as ADD or DELETE, to add or remove participants or MODIFY to change what telephone number a participant will be contacted on. FIG. 6C shows the addition of one participant 650*a* and the removal of another 650*b*. As shown in FIG. 6D, conference call server 55 can be adapted to send the moderator 615 a confirmation e-mail 604 with the modified details of the scheduled call, including when the call will be initiated 640 and the modified list of participants 645*a*.

Figure 6E:
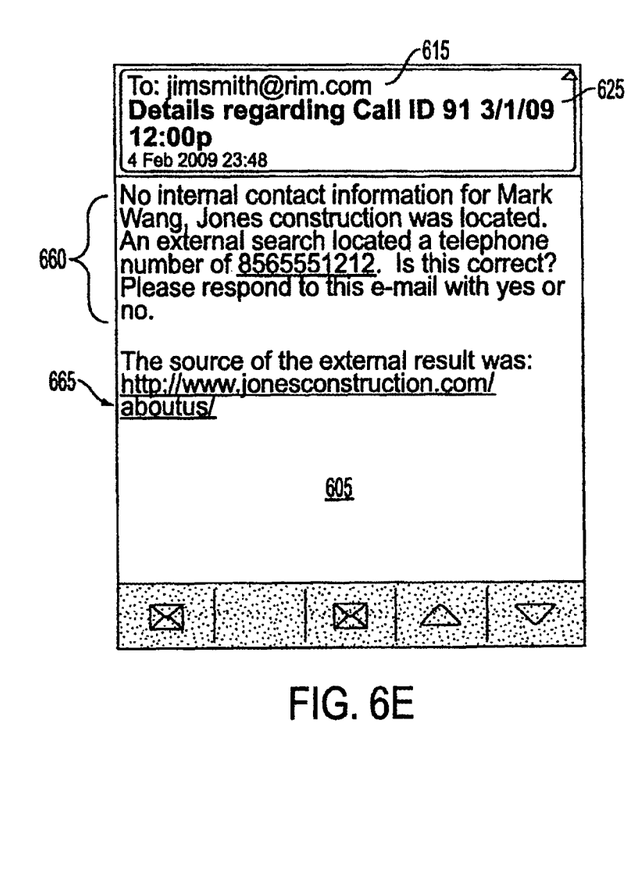

As will be described in more detail below, the conference call server 55 can be adapted to use a hierarchy of internal and external sources of information to locate a telephone contact number for call participants. FIG. 6E shows an example of a contact confirmation e-mail 605 to moderator 615, where text information 660 regarding retrieval of information regarding a contact is communicated to moderator 615 for its approval. The e-mail 605 can optionally include the source 665 of the contact information such as a website retrieved via the Internet.

Figure 7A:
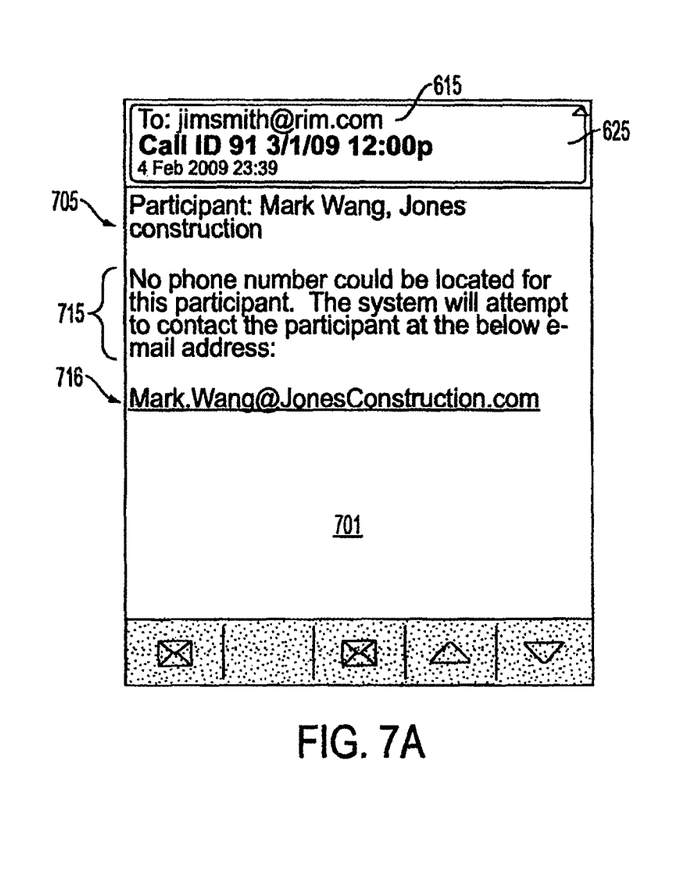
FIGS. 7A-7D show exemplary communications on a mobile communications device according to another embodiment of the methods and systems disclosed herein.
Figure 7B:
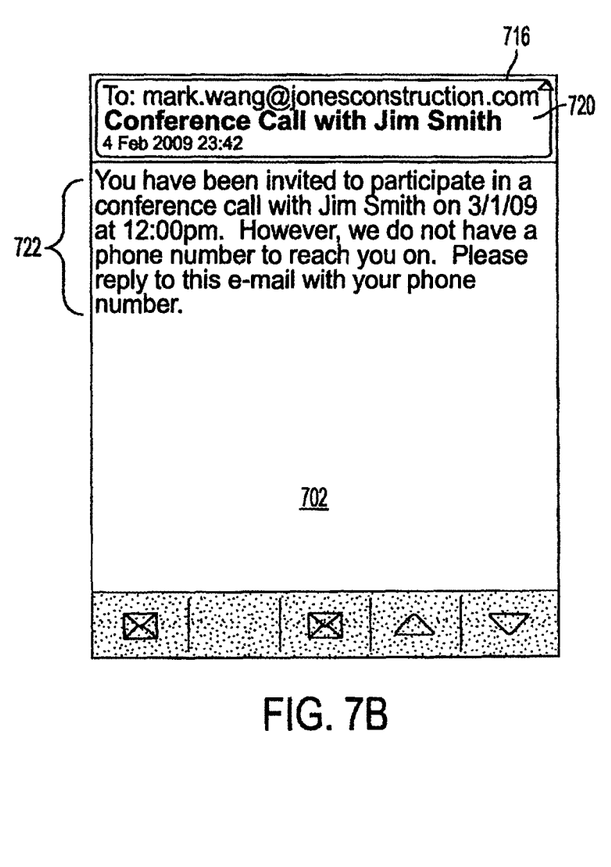
Figure 7C:
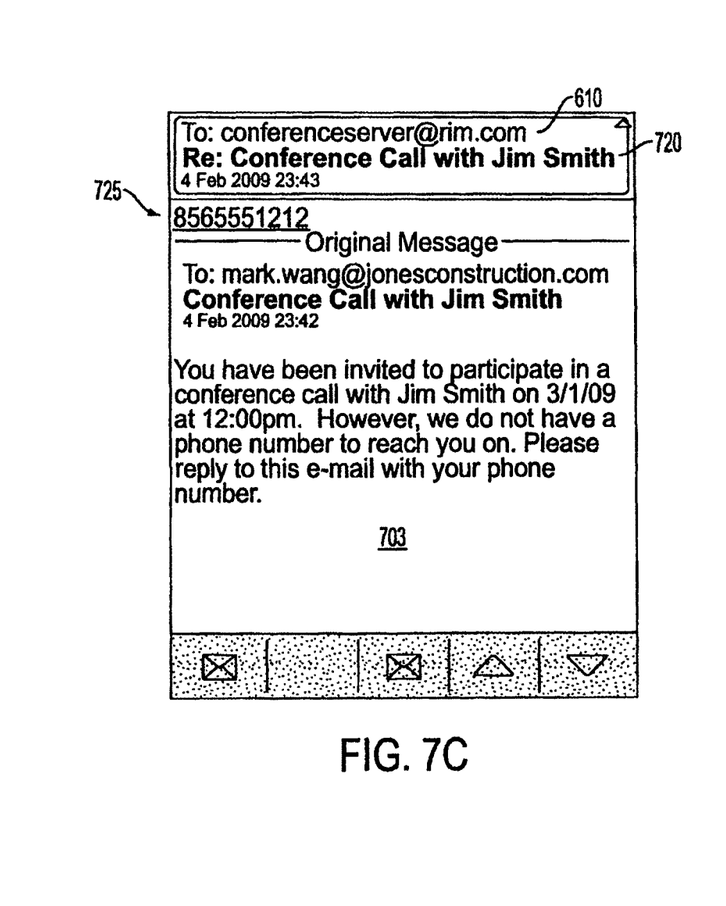

As shown in FIGS. 7A-7C, the conference call server 55 is also adapted to reach out to scheduled call participants and collect telephone contact information (via e-mail) when there is an e-mail address on file. It should be appreciated that other communication mediums can also be used to contact a participant. FIG. 7A shows an example of a contact confirmation e-mail 701 which is sent to moderator 615 stating no telephone contact information could be located for a participant 705. The e-mail 701 can include text 715 stating that an e-mail address 716 is on file for the participant 705 and that there will be an attempt to contact the participant using that address 716. FIG. 7B shows the e-mail communication 702 to address 716 providing information 722 about the scheduled call and asking for the participant 705 to respond to the e-mail. The subject line 720 also states the purpose of the e-mail (e.g., the scheduled time of the conference call, or the name of the moderator). FIG. 7C shows an example response e-mail 703 to the conference call server e-mail address 716 with a participant's contact number 725. In one embodiment, the conference call server will only accept a response from the participant's e-mail address 716 on file.

Figure 7D:
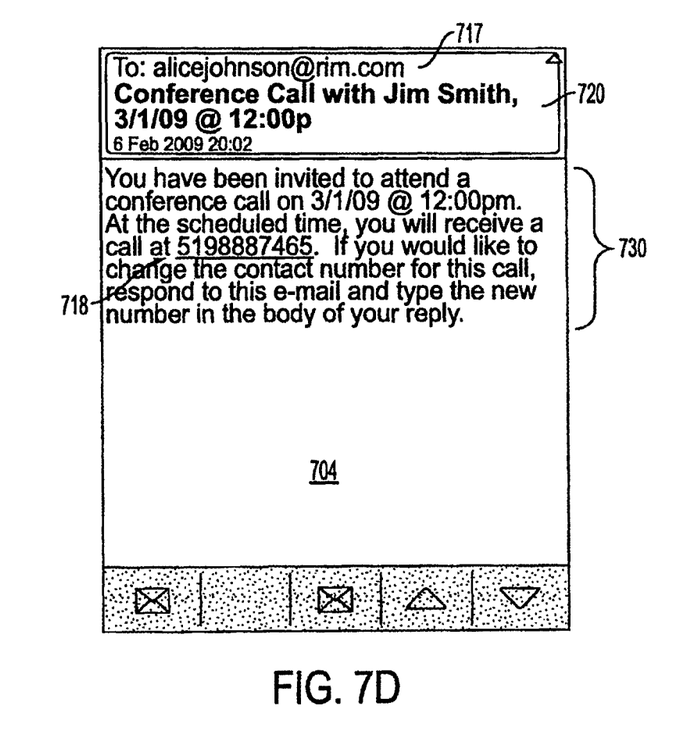

In one embodiment (as shown in FIG. 7D), the conference call server 55 can send a confirmation e-mail 704 to participants (e.g., participant 630*b*) whose e-mail address 717 is on file. The e-mail 704 can include information regarding the call 730 and can specify the telephone contact number 718 on which the participant 630*b* will be called. Optionally, the participant 630*b* can reply to the confirmation e-mail 704 to provide alternate telephone contact information for the call. In another embodiment, the confirmation e-mail 704 can contain attachments sent to the conference call server 55 by the user initiator in the initial scheduling e-mail 701.

Figure 8A:
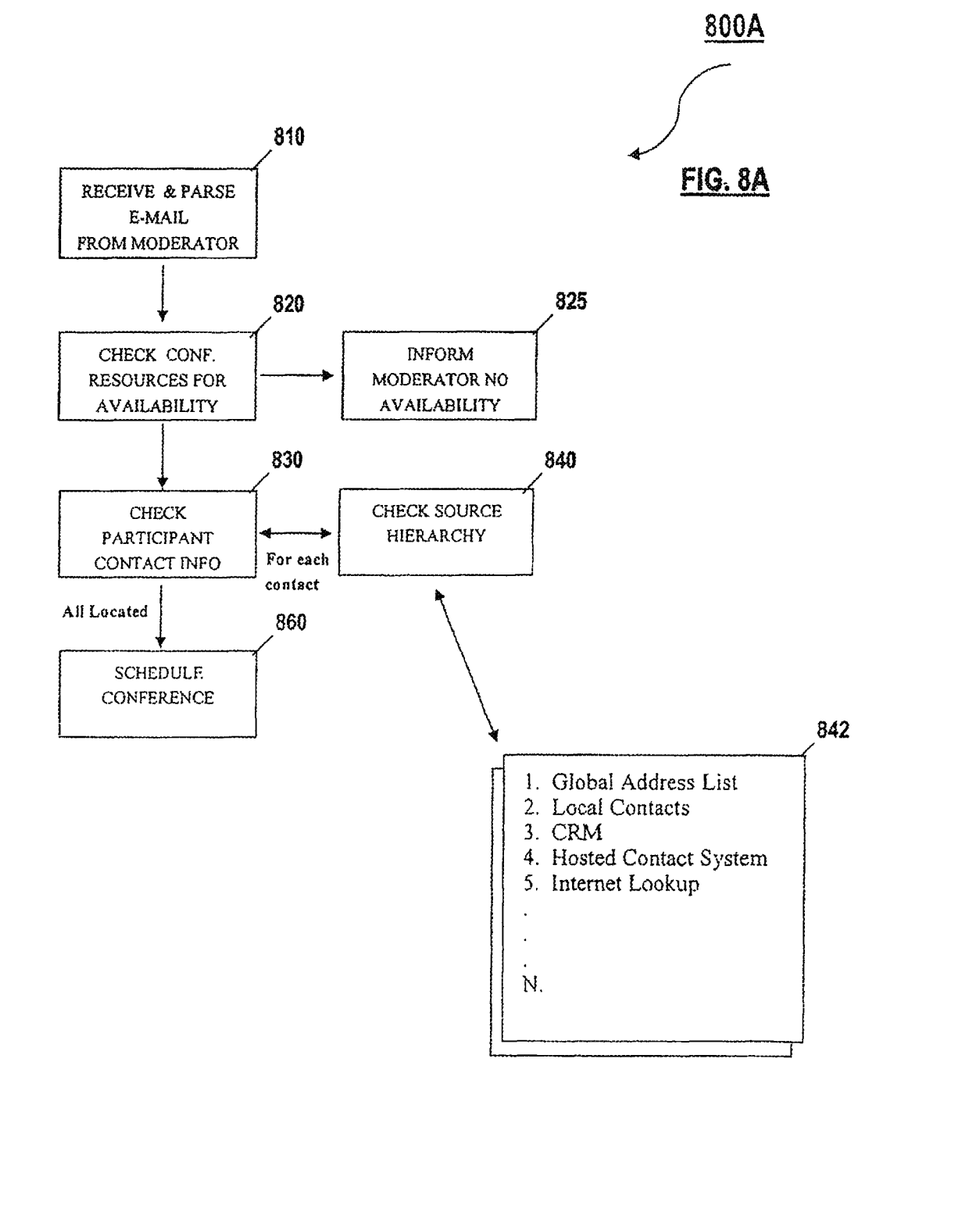
FIGS. 8A-8B illustrate examples of processes carried out in accordance with embodiments disclosed herein.

The e-mail call scheduling process described above is now described in further detail with reference to methods 800A and 800B illustrated in FIGS. 8A and 8B and can be used to schedule 'Get Me' or 'Meet Me' type conference calls. In one embodiment, the process 800A (as shown in FIG. 8A) is executed by conference call server 55. In an initial step 810, the conference call server 55 receives an e-mail from, e.g., a moderator. The conference call server 55 parses the e-mail to determine the scope of the request. Next in, step 820, the conference call server 55 is adapted to determine whether there will be sufficient resources (e.g., telephone line or conference bridge capacity) available to host the call requested in step 810. If the resources are unavailable, the conference call server 55 will notify the moderator (step 825). In an alternate embodiment, the conference call server 55 can determine one or more alternate times when the moderator can schedule the call and alert the moderator of the alternatives by e-mail or other means.

Once it is determined that resources are available for the call, the conference call server 55 is configured to identify telephone contact information for each participant identified in the request (step 830). The method continues at step 840. In step 840, the conference call server 55 will attempt to resolve a telephone contact number for each participant using various sources including, but not limited to: (1) Contact information within the e-mail chain between the conference call initiator and the conference attendees; (2) a moderator's local contact list within e-mail or address book clients such as Microsoft Office Outlook™, Lotus Notes™ or ACT™; (3) an enterprise's corporate directory such as Microsoft Active Directory™, LDAP; (4) an enterprise's CRM, ERP or other corporate applications systems such as Microsoft CRM™, Oracle CRM™, SAP™, Remedy™, PeopleSoft™; (5) a Global Address List (GAL) lookup to resolve contact information for attendees within the enterprise (when an Enterprise Server 12 such as that depicted in FIG. 1 is integrated); (6) hosted contact management systems such as Google™ Address book, Yahoo™, MSN™, AOL™, and Plaxo™; or (7) through customized search protocols that make use of publicly available sources of contact information (e.g., corporate websites, Google™, the Yellow Pages™). The conference call server 55 can follow a customizable hierarchy 842 (e.g., local calendar application→corporate directory→internet search engine) of contact sources to find, locate and later confirm a participant's telephone contact information (as described above).

In one embodiment, sources on the same network as the conference call server 55 are prioritized. For example, in another embodiment, users of conference call server 55 can individually customize the hierarchy using a web interface to conference call server 55, which can optionally include storage of which users are authorized to use the system as well as configuration preferences for those users. In a further embodiment, the conference call server 55 can be programmed to determine telephone contact information for each participant by searching internal, networked and Internet sources and then verifying the results (using e-mail similar to those depicted in FIGS. 6D and 6E) of those searches with the moderator of the conference call. After all participant contact information is identified, in step 860, the conference call is scheduled.

Figure 8B:
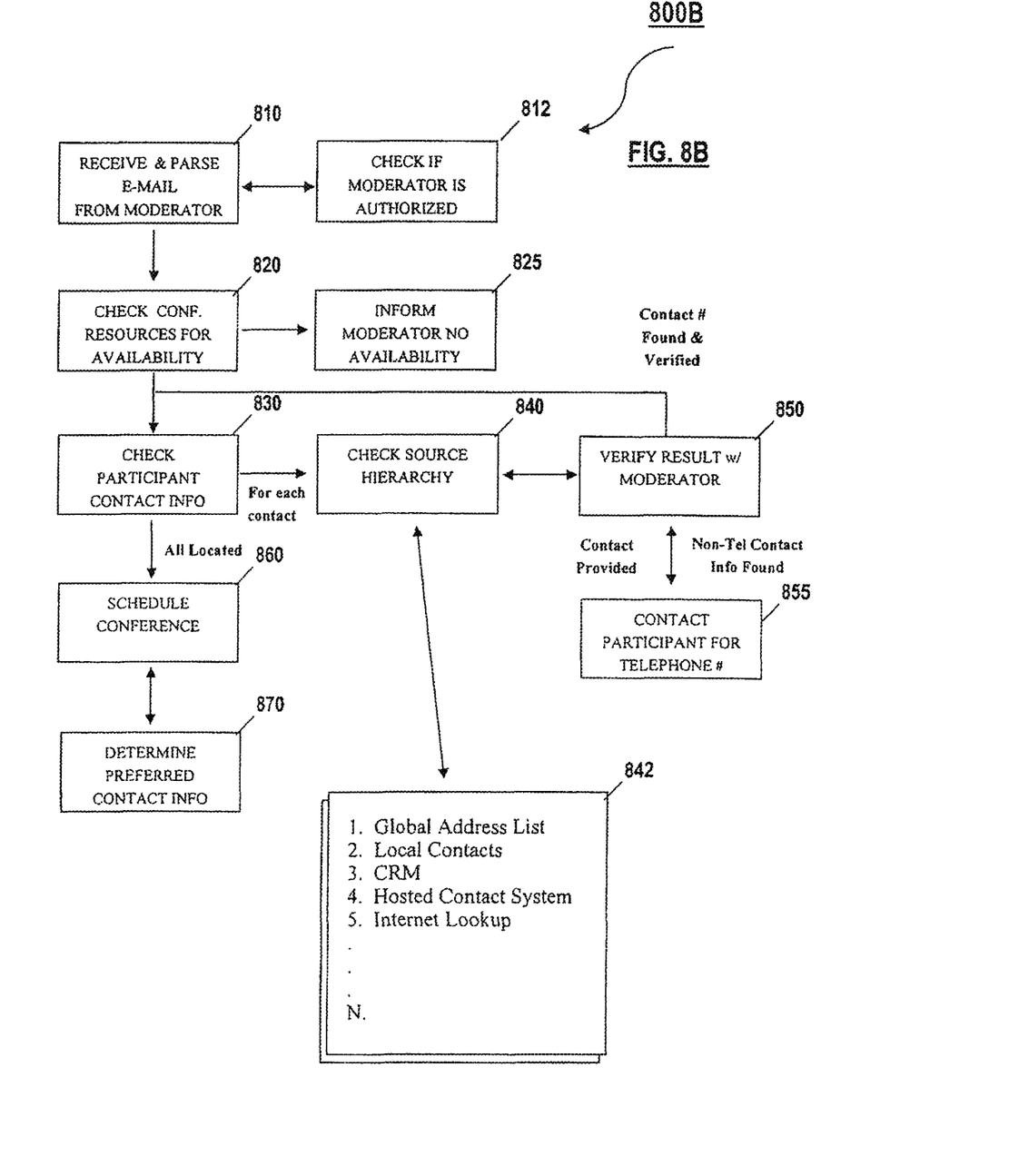

FIG. 8B shows process 800B in which additional functions are added. First, after the conference call request is received, in step 812, the conference call server 55 can determine whether the moderator is an authorized user of the system. If not, the request is denied and the conference call server 55 can reply to the request informing the sender they are not authorized to use the system. With respect to the source hierarchy 842, each source of contact information in the hierarchy 842 can be identified as trusted or untrusted. For trusted sources, such as internal directory information, no further confirmation from the moderator is needed. For untrusted sources (e.g., any Internet source), in step 850 the conference call server 55 can be optionally adapted to e-mail the moderator (as shown in FIG. 6E) to identify the source of telephone contact information used and confirm the identified telephone contact information with the moderator. A further optional step 855 allows the conference call server 55 to reach out to participants for whom no telephone contact information is identified. Using an e-mail address or other alternate communication method, conference call server 55 can, in step 855, contact the participant by e-mail (as shown in FIGS. 7A-7C) and obtain telephone contact information (as described above). If the participant responds to the e-mail (e.g., e-mail 702) the conference call server 55 can store the contact number(s) (permanently or temporarily) for that participant. Conference call server 55 is also capable of querying the participant to determine if the contact information should be stored as 'public' or 'private,' for just a single conference and/or permanently. Lastly, after the conference call has been scheduled in step 860, the conference call server 55 is adapted to communicate with the participants (in step 870) to determine if the telephone contact number on file is the preferred contact number for the participant (as shown in e-mail 704 in FIG. 7D). For instance, although a work telephone number might be stored in an enterprise's corporate directory, a participant may be taking the conference call from outside the office and prefer to be called on their home or cellular telephone number.

For 'Meet Me'-type conferences, the conference call server 55 can also use the contact number for a participant for additional or extra validation or authentication. Specifically, if a participant is calling from within a verified corporate environment (e.g. Desk phone extension number) or if the calling number matches the contact number on file, the conference call server 55 can waive the need for the attendee to enter its PIN #.

Figure 9:
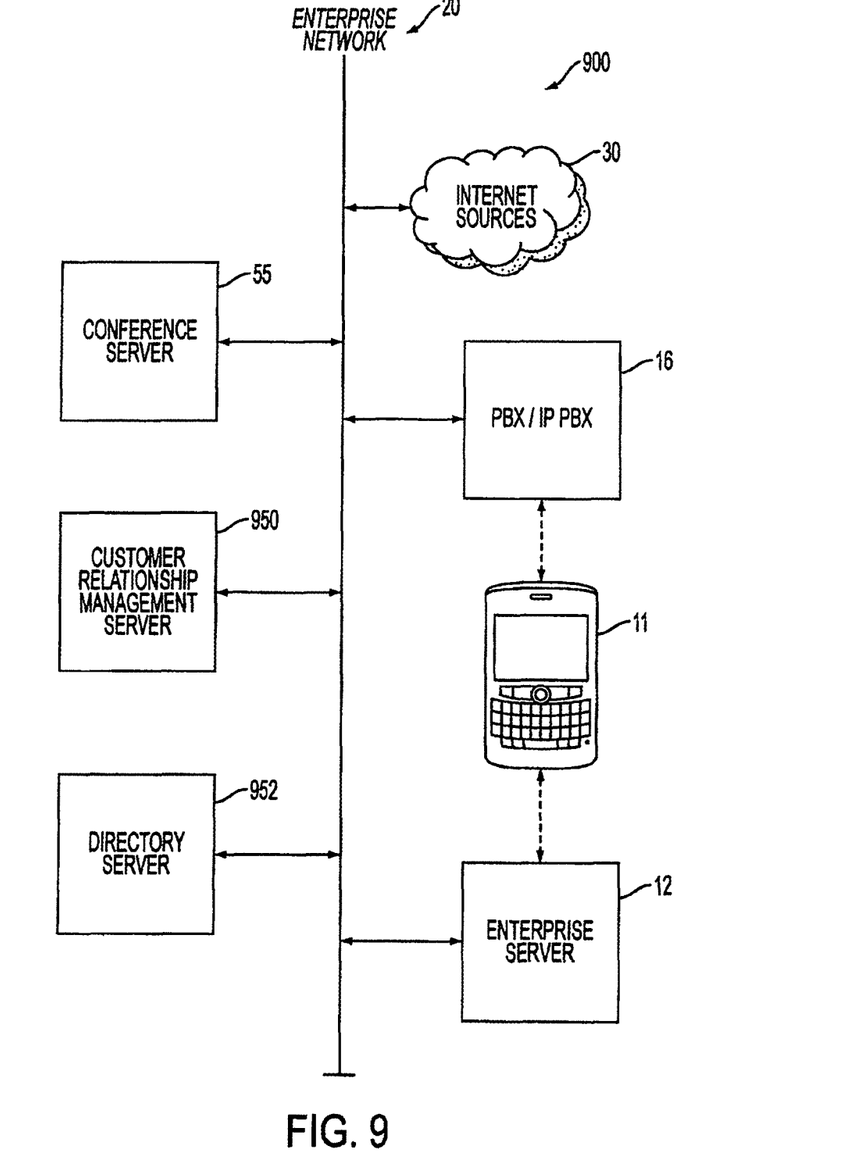
FIG. 9 illustrates an example of a computer network implemented according to an embodiment disclosed herein.

Referring now to FIG. 9, a system 900 running on an enterprise network 20 (such as that shown in FIG. 1) is now described that is capable of executing the processes described above. Enterprise Network 20 is preferably an internal network, but can also include a connection to the Internet or WAN 30 (as depicted in FIG. 1) for connection to external sources of contact information. Conference call server 55 executes and manages process 800 discussed above (FIG. 8). Contact information can be retrieved from a customer relationship management (CRM) Server 950, directory server 952, and enterprise server 12. As also shown in FIG. 9, present on enterprise network 20, is a PBX/IP PBX 16 which can perform the function of a conference bridge when prompted by the conference call server 55.

It should be noted that the system described herein is also not restricted to traditional voice conference services and could be adapted for web collaboration or web-enabled conferencing. In this manner the system could be adapted (in a reverse fashion to the above-described methods of locating telephone contact information) to use IVR to reach out (where a phone number is known) to participants to confirm e-mail addresses or web contact information. It should also be further understood that while e-mail is a preferred method of communication with conference call server 55, other two-way communication mediums (e.g. MMS, SMS) can be used as well.

Certain adaptations and modifications of the described embodiments can be made. Therefore, the above discussed embodiments are considered to be illustrative and not restrictive.

What is claimed is:

1. A method of scheduling a conference call using a conference call communication comprising scheduling information for one or more identified participants, the method comprising:
   determining, by a conference call server after receiving the conference call communication, telephone contact information for one or more identified participants by querying a first source of contact information provided by an enterprise network and, if the telephone contact information is not available from the first source of contact information, querying a second source of contact information outside of the enterprise network; and
   scheduling, by the conference call server, the conference call using the conference call communication.

2. The method of claim 1, wherein the conference call communication is one of an email, an SMS, and an MMS.

3. The method of claim 1, wherein the conference call communication further specifies identity information of a moderator.

4. The method of claim 3, further comprising sending a confirmation communication to the moderator after scheduling the conference call.

5. The method of claim 3, further comprising sending a confirmation to the moderator when a source of telephone contact information of a participant is identified as untrusted.

6. The method of claim 1, wherein a sender of the conference call communication is automatically assigned as a moderator of the conference call.

7. The method of claim 1, wherein scheduling the conference call is based on the telephone contact information being determined.

8. The method of claim 1, wherein the first source of contact information is one or more internal sources of contact information located on an enterprise network, the second source of contact information is one or more external sources of contact information located outside of the enterprise network, and wherein the first and second sources are part of a customizable hierarchy of sources of contact information.

9. The method of claim 8, wherein the one or more internal sources of contact information are selected from the group consisting of:
   contact information contained in the conference call communication, an address book client, a corporate directory, a customer relationship management system, and a global address list.

10. The method of claim 8, wherein the one or more external sources of contact information are selected from the group consisting of:
 an externally-hosted contact management system and a customized Internet search protocol.

11. The method of claim 1, wherein scheduling the conference call modifies a previously scheduled conference call using identity information of one or more identified participants in the conference call communication.

12. A conference call scheduling system configured to schedule a conference using a conference call communication comprising schedule information for one or more identified participants, the system comprising:
 a conference call server configured to:
  determine, after receiving the conference call communication, telephone contact information for one or more identified participants by querying a first source of contact information provided by an enterprise network and, if the telephone contact information is not available from the first source of contact information, querying a second source of contact information outside of the enterprise network; and
  schedule the conference call using the conference call communication, wherein a conference bridge connects one or more identified participants to the conference call according to the telephone contact information determined by the conference call server and the scheduling information of the conference call communication.

13. The system of claim 12, wherein the conference call server manages resources of the conference bridge.

14. The system of claim 12, wherein the schedule information of the conference call communication comprises at least a requested date and time.

15. The system of claim 14, wherein when scheduling information is parsed by the conference call server, the conference call server is configured to determine if the resources of the conference bridge are available at the requested date and time.

16. The system of claim 12, wherein the first source of contact information is one or more internal sources of contact information located on an enterprise network, the second source of contact information is one or more external sources of contact information located outside of the enterprise network, and wherein the first and second sources are part of a customizable hierarchy of sources of contact information.

17. The system of claim 16, wherein the one or more internal sources of contact information are selected from the group consisting of:
 contact information contained in the conference call communication, an address book client, a corporate directory, a customer relationship management system, and a global address list.

18. The system of claim 16, wherein the one or more external sources of contact information are selected from the group consisting of:
 an externally-hosted contact management system and a customized Internet search protocol.

19. The system of claim 12, wherein the conference call scheduling system is further configured to determine if the telephone contact information provided for one or more identified participants is a preferred telephone contact information.

20. The system of claim 12, wherein the conference call communication is one of an email, an MMS, and an SMS.

21. The system of claim 12, wherein scheduling the conference call is based on the telephone contact information being determined for one or more identified participants.

22. The system of claim 12, wherein the conference call server is configured to schedule the conference call by modifying a previously scheduled conference call using identity information of one or more identified participants in the conference call communication.

23. A non-transitory computer-readable medium that stores a set of instructions that are executable by at least one processor of a device to cause the device to perform a method of scheduling a conference call using a conference call communication comprising scheduling information for one or more identified participants, the method comprising:
 determining, after the conference call communication has been acquired, telephone contact information for one or more identified participants by querying a first source of contact information provided by an enterprise network and, if the telephone contact information is not available from the first source of contact information, querying a second source of contact information outside of the enterprise network; and
 scheduling the conference call using the conference call communication.

* * * * *